United States Patent [19]

Santucci

[11] Patent Number: 4,602,124

[45] Date of Patent: Jul. 22, 1986

[54] DUCTING SYSTEM FOR WIRING HAVING CHANNEL ALIGNMENT INTERFACE MEMBERS

[76] Inventor: Donald Santucci, 1780 Shire Ct., Wheaton, Ill. 60187

[21] Appl. No.: 390,757

[22] Filed: Jun. 21, 1982

[51] Int. Cl.[4] .......................... H02G 3/04; H02G 3/06

[52] U.S. Cl. ....................................... 174/101; 52/287; 138/157; 174/72 C

[58] Field of Search ............... 174/48, 49, 68 C, 70 C, 174/72 C, 95, 97, 101, 117 A, 71 R, 72 R; 138/108, 116, 155, 157, 115, 117; 339/22 R, 23; 52/220, 221, 287, 288; 285/24, 27, 121, 137 R, 156

[56] References Cited

U.S. PATENT DOCUMENTS

| | | | |
|---|---|---|---|
| 686,052 | 11/1901 | Golding | 138/157 X |
| 1,981,742 | 11/1934 | Murphy | 138/163 |
| 3,171,702 | 3/1965 | Schumacher et al. | 174/101 X |
| 3,697,667 | 10/1972 | Pollak et al. | 174/101 X |
| 4,391,426 | 7/1983 | Gothberg | 174/97 X |

FOREIGN PATENT DOCUMENTS

| | | | |
|---|---|---|---|
| 25369 | 8/1972 | Australia | 174/101 |
| 1321923 | 2/1963 | France | 174/72 C |
| 484540 | 2/1970 | Switzerland | 174/48 |
| 561969 | 5/1975 | Switzerland | 174/101 |
| 583935 | 1/1947 | United Kingdom . | |
| 599995 | 2/1948 | United Kingdom . | |
| 932453 | 7/1963 | United Kingdom . | |
| 1021871 | 3/1966 | United Kingdom | 174/101 |
| 1186222 | 4/1970 | United Kingdom . | |
| 1186271 | 4/1970 | United Kingdom . | |
| 1259493 | 1/1972 | United Kingdom . | |
| 1383413 | 2/1975 | United Kingdom . | |
| 1493410 | 11/1977 | United Kingdom | 174/72 C |
| 1559142 | 1/1980 | United Kingdom | 174/101 |

OTHER PUBLICATIONS

"*La-in*" *Catalog and Handbook,* published by National Electric Products Corporation, Pittsburgh, PA, 1938, pp. 25, 26, 31, 32 and 34.

*Primary Examiner*—Laramie E. Askin

*Attorney, Agent, or Firm*—McDougall, Hersh & Scott

[57] ABSTRACT

A ducting system for electrical wiring or the like including elongated channels and channel covers and prefabricated channel interface assemblies adapted for rapid non-defacing installation without resort to special tools or precision assembly techniques. The interface assemblies are comprised of alignment members which are adapted to engage two or more channels thereby to automatically position the channels in a predetermined relationship. More specifically, projections are provided on the alignment members which are received within recesses on the ends of the duct channels thereby functioning to properly and automatically orient the several duct channels upon system assembly. The interface assemblies further include removable cover means which bridge and conceal the respective ends of the channels and channel covers thereby eliminating precision cutting of the duct sections.

1 Claim, 6 Drawing Figures

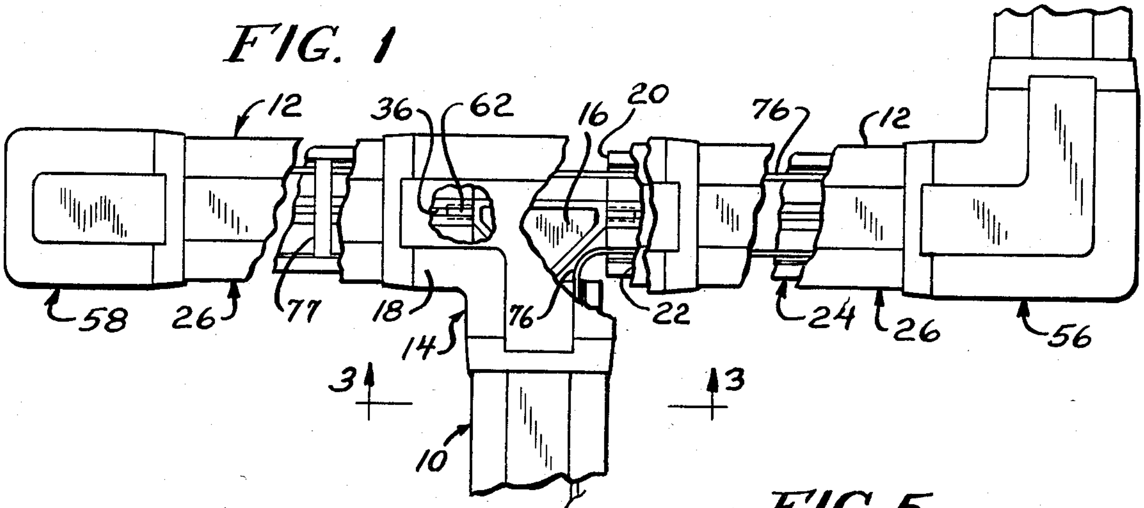
FIG. 1
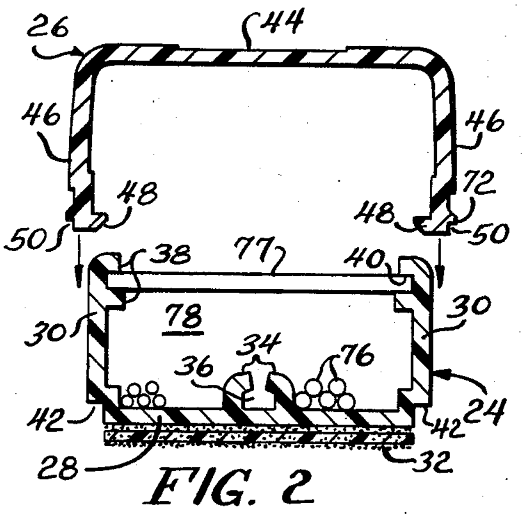
FIG. 2
FIG. 5
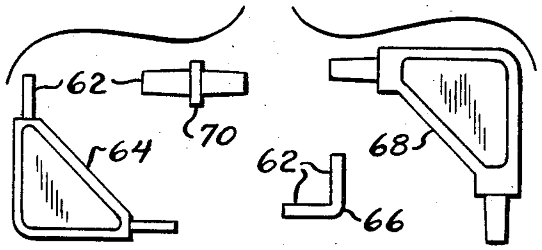
FIG. 6
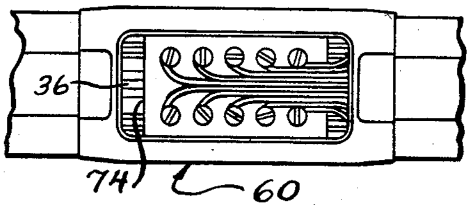
FIG. 3
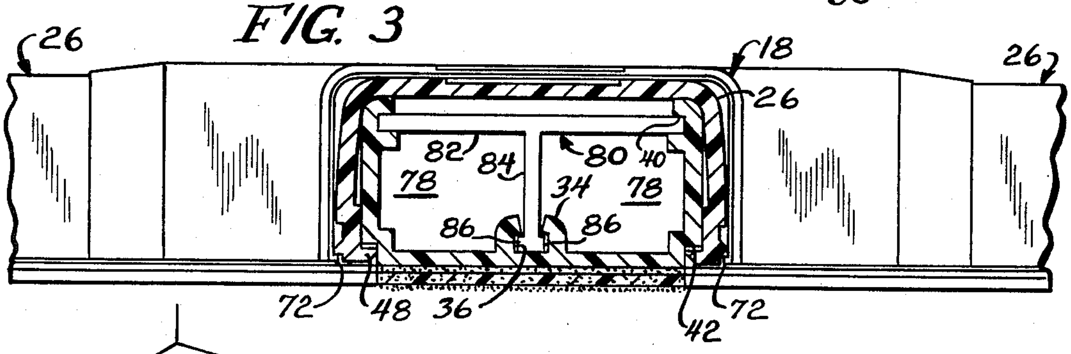
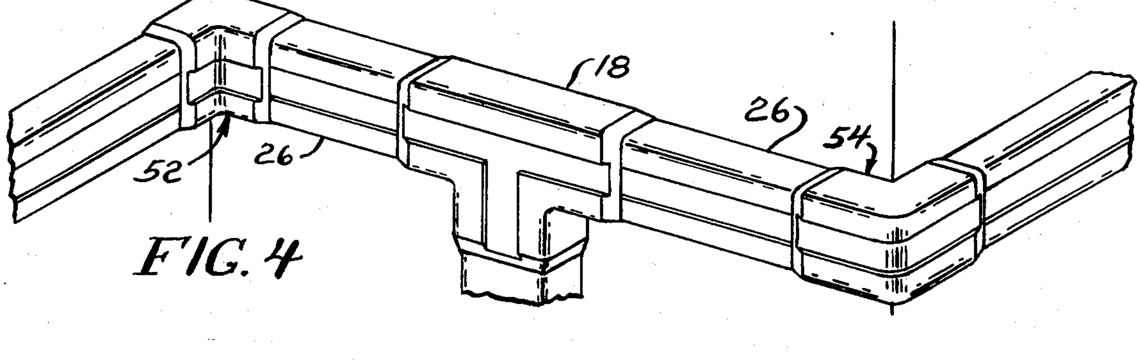
FIG. 4

DUCTING SYSTEM FOR WIRING HAVING CHANNEL ALIGNMENT INTERFACE MEMBERS

This invention relates generally to duct systems for the containment of electrical wiring, conduits, or other similar objects and, in particular, to a duct system having interface and terminal components adapted to exposed installation on pre-existing structures or in applications where frequent or subsequent wiring changes are contemplated. The uses for electrical wiring, both in the home and in business, have been steadily increasing in recent years. Applications now include, for example, telephone, intercom, TV and video, hi-fi, burglar and other alarms, computer and general control systems. The expanding and ever-changing nature of these uses effectively precludes permanent in-wall conduit wiring installed during initial building construction. And, in most instances, subsequent in-wall installation is often destructive and prohibitively expensive.

Wiring ducts have been known for many years. Such systems, however, due to various limitations are often unsuitable or undesirable for many applications. Certain ducts, for example, are adapted for installation only in limited, special environments. The duct system shown in U.S. Pat. No. 3,471,629 to O'Leary FIG. 28, is such a duct, incorporating parallel spaced flanges specifically designed to mount the duct to room dividers or partitions. The O'Leary duct is therefore unsuitable for general in-room installation.

Present known duct systems generally utilize screws or similar anchors to secure the duct to the desired surfaces. Examples include Schwab, U.S. Pat. Nos. 4,166,195; 4,136,257; Taylor, U.S. Pat. No. 3,909,505; or Pollak et al, U.S. Pat. No. 3,697,667. These duct systems variously require anchoring through bottom conduit face, flanges integral to the duct, or separate clamp elements. Each relies upon a nail or screw driven into the mounting surface for attachment. These ducts involve relatively difficult and time consuming installations. In addition, nail or screw installations in the respective mounting surfaces will permanently mar the mounting surface and, consequently, unless the installation is permanent, subsequent duct system reconfiguration will necessarily expose the marred former mounting surface. Removal or reconfiguration of the ducts requires time consuming and expensive hole patching to restore the previous mounting surface to its original, pre-installation condition. The duct of this invention, by contrast, utilizes a pre-applied adhesive backing which facilitates rapid anchorless installation. Since no holes are required, this duct can readily and rapidly be reconfigured with a minimum of damage to abandoned mounting surfaces.

Difficulties with installation of convention ducts are not limited merely to the above discussed mounting considerations. Installation of a complete duct system also requires the measuring, cutting and fitting of duct channels with various interface assemblies including elbows, inside and outside corners, tees, splices and ends. Conventional systems generally require that each individual length of duct channel be accurately measured and neatly and squarely severed to permit proper abutment with mating corner or other interface assemblies. In D'Esopo, U.S. Pat. No. 3,404,706, for example, inaccurate or non-square cutting may result in the channels not fitting or, at least, in a sloppy, unsightly installation having visible gaps and rough edges. Other systems, such as shown in O'Leary, U.S. Pat. No. 3,471,629, which utilize no corner interface assemblies, require precisely cut and mitred corners to achieve an accurate and acceptable appearing junction. The duct system of this invention, by contrast, employs pre-fabricated assemblies adapted to conceal duct channel and channel cover ends thereby obviating precisely measured and cut or mitred ends as required by conventional duct systems and simplyfying installation to a degree where an unskilled homeowner can produce a professional-appearing installation with simple tools.

In addition, the duct channel of this invention incorporates a bottom T-groove and a series of ridges in the channel sidewalls adapted to create a highly flexible mounting capability in which a wide variety of wire retainers, component carriers, terminal points, printed circuit boards, jacks, switches or duct channel expanders can be affixed therein. In this manner, the duct system of this invention functions not merely as a raceway to conceal and retain wires, but as a total containment system for interfacing physically separated apparatus.

An object of this invention, therefore, is an economical ducting system suitable for in-room installation by unskilled individuals in existing buildings and structures. Attachment is preferably accomplished with a taped adhesive pre-applied to the duct channels to facilitate rapid and effortless installation while minimizing marring or damaging of the underlying attachment surface inherent in ducts anchored by nails or screws.

Duct channels, covers, and interface assemblies are preferably fabricated, by extrusion or molding, from economical and easy to handle material such as PVC plastic. Channels include a T-groove and ridges which create a flexible retention scheme whereby wire retainers, terminal or component carriers, jacks, switches and the like may be positioned and retained within, or adjacent, an associated duct channel span. The duct system will preferably include such component carriers and a complete family of interface assemblies, such as elbows, inside and outside corners, tees, splices and ends, in combination with straight duct channel segments to facilitate flexible installations adapted to particular user requirements.

Channel and interface assembly covers will be easily removed and reinstalled to expedite rerouting or additions to the electrical cables therein. Duct interface assemblies will eliminate the necessity of accurately measuring and cutting duct channels and channel covers. In addition, user fabricated precision mitred corners or elbows will not be required. The system will be suited to subsequent expansion or deletion of duct routes in response to changing user needs.

Various other objects and advantages of the invention will hereinafter become more fully apparent from the following description of the embodiments and the drawings wherein:

FIG. 1 is a plan view of a typical duct installation of this invention showing straight duct segments, an elbow, a 'tee' junction, and an 'end'; wherein portions are broken-away to reveal duct channels, wires, wire retainer, interface assembly alignment member as well as overall structural component relationships;

FIG. 2 illustrates separate cross-sectional views of a duct channel and a channel cover of the invention including adhesive channel attachment material, wires, and wire retention clip;

FIG. 3 is a cross-sectional view of a duct segment taken along line 3—3 of FIG. 1 and illustrating the side elevational relationship between duct channels, channel covers, interface assembly covers and a portion of the assembled duct system;

FIG. 4 is a perspective view of a typical assembled duct system of this invention illustrating the use of inside and outside corners and 'tee' junctions;

FIG. 5 illustrates interface assembly alignment members of the invention; and

FIG. 6 illustrates a mid-span terminal/component breakout point.

PREFERRED EMBODIMENT

FIG. 1 illustrates a typical portion of the duct of this invention wherein a vertical duct segment 10 is shown intersecting a generally horizontal span 12 of ducting to form a 'tee' junction. A duct interface assembly 14 comprising alignment member 16 and interface cover 18 joins and decoratively covers exposed channel ends 20 and channel cover ends 22. A complete installation of this ducting may include multiple spans of ducting, such as shown at 10 and 12, interconnected by appropriate interface assemblies, such as the 'tee' assembly shown at 14, to link the multiple terminal or mid-span locations.

Each duct span includes a length of duct channel 24 and a generally equal length of duct channel cover 26. Channels 24 and covers 26 are extruded, preferably of a PVC material and supplied in standard lengths which the user can readily cut as required to meet his specific installation needs.

As best seen in FIG. 2, channel 24 comprises a bottom 28 and a pair of spaced sidewalls 30 defining a generally U-shaped cross-section. A double-backed adhesive strip or tape 32 is positioned along the outer face of bottom 28. Tape 32 is provided with a protective covering sheet which, when peeled off and removed, exposes the adhesive material to permit attachment of channel 24 to a wall or other surface.

A pair of complementary L-shaped ridges 34 extend inwardly generally from the center of bottom 28 and define a 'T' groove 36 therebetween running longitudinally along the bottom of the channel. Each sidewall 30 contains a pair of inward facing parallel retention ridges 38 positioned generally adjacent the upper free edge of wall 30. Clip or component carrier retention slots 40 are defined between respective ridges 38 on each sidewall. Rectangular cover retention recesses 42 are provided in the lower outer sidewall surfaces adjacent bottom 28.

Channel cover 26 comprises a top 44 and two spaced parallel cover sides 46. Opposed lips or flanges 48 extend inwardly from respective lower free edges of sides 46. Interface cover engaging recesses 50 are provided along the lower outer surface of walls 46. A non-uniform relief or pattern of grooves is otherwise provided on the outward facing surfaces of cover 26 to enhance the esthetic appearance of the cover.

The ducting system of this invention includes a 'family' of interface assemblies which are adapted to engage and interconnect individual duct channel spans. These assemblies permit the 'contouring' of the duct system around corners where straight linear installations are either impractical or impossible as well as the splicing of multiple standard length channel spans where longer overall duct lengths are required. Typical interface assemblies of this type include right angle inside 52 and outside 54 corners and elbows 56. In addition, multiple channel interface assemblies, such as 3-channel 'tee's' or 'wye's' or 4-channel cross-intersections, add system flexibilty by permitting duct branching and crossing. Duct channel 'end' members 58, as shown in FIG. 1, and terminal or component break-outs 60, as shown in FIG. 6, also are contemplated.

FIG. 1 illustrates a typical interface assembly of this invention. Interface assembly 14 includes 'tee' alignment member 16 and 'tee' interface cover 18. Alignment member 16 is a rigid molded plastic piece having projections 62 which are inserted into T-grooves 36 (FIG. 2) in friction engagement with ridges 34. Alignment members serve to properly position respective channel ends 20 with respect to one another during installation and to maintain this relationship thereafter. Alignment members are uniquely dimensioned for each different interface assembly configuration. Thus, the number and positioning of projections 62 from any given alignment member will characterize the configuration of the resulting duct interface. For example, the alignment member 16 shown in FIG. 1 includes a pair of oppositely facing projections 62 positioned on a common longitudinal axis and a third projection (not shown) disposed perpendicularly midway therebetween. The configuration establishes the 'tee' interface assembly shown. Other alignment members, including projections 62, are illustrated in FIG. 5. Inside and outside corner, elbow and splice alignment members are shown and respectively identified by reference numbers 64, 66, 68 and 70. Duct end members 58 and terminal or component mid-span breakouts 60 do not generally require alignment members as only a single channel span or end is associated with each of these components.

Interface covers 18 are, similarly, uniquely dimensioned to achieve the desired channel interface. Thus, a 'tee' cover 18 is combined with a corresponding 'tee' alignment member 16 to create a 'tee' interface assembly. As illustrated in FIG. 3, 'tee' interface cover 18 has a substantially U-shaped cross-section dimensioned to closely fit over channel covers 26. One or more inwardly facing ridges or flanges 72 are provided along the opposed bottom edges of interface cover 18. These ridges or flanges 72 serve to retain cover 18 by mating with recesses 50 in duct channel covers 26. Interface covers 18 are further dimensioned to interconnect and overlap both the respective duct channels and channel covers thereby assuring proper cover to cover engagement and a decorative assembly completely enclosing the channel interface region defined between respective channel ends 20.

A central feature of the duct of this invention is found in the simplicity of installation by the unskilled and uninitiated where precision cutting, skilled assembly techniques or special tools are unnecessary. First, a ducting route interconnecting the desired cable terminal points is chosen which may include any combination of linear ducting spans and available interface assemblies. The distances between adjacent interface assemblies are measured and standard extruded duct channels 24 and channel covers 26 are cut accordingly. Corresponding or mating duct channels and channel covers are cut to substantially the same length. Precision cutting or squaring of end surfaces is not required as the ends of both duct channel 24 and channel cover 26 are ultimately concealed by the interface cover 18. Thus, a common or similar inexpensive and readily available cutting may be used.

Once cut to proper length, channels 24 are readily installed simply by peeling back the protective backing, thereby exposing the adhesive surface 32, and by pressing the duct channel 24 against the desired wall or other surface. Positioning of adjacent duct channels at interface assemblies is facilitated by use of alignment members 16, or 64, 66, 68, 70 (FIG. 5). Specifically, alignment member projections 62 are urged into respective T-grooves 36 at channel ends 20 prior to securing the channels to the surface. Alternatively, an alignment member may be inserted into the T-groove 36 end of a previously secured channel prior to attachment of the remaining channels comprising the interface assembly junction. Subsequently, each of the remaining channels may, in turn, be positioned with respect to the interface by inserting alignment member projections 62 into successive channel T-grooves 36. In this manner, the ducting of this invention can be rapidly and accurately assembled from one terminus to another by successively and alternately mounting duct channel segments and interface alignment members. Multiple channel 'tee' or 'wye' interfaces are installed in the same manner except that each of the separate branches is installed independently to its respective terminus.

Terminal or component carriers 74, as shown in FIG. 6, are positioned along the duct channel as desired. Ridges 38 and T-groove 36 are adapted to provide flexible mounting alternatives to meet the requirements for differing terminal or component carrier option. For example, a carrier may be positioned between opposing slots 40 in a similar fashion to that shown for cable retention clip 77, FIG. 2. Alternatively, a carrier may be retained within T-groove 36 and, if desired, 'three-point' attachment can be achieved by dimensioning the carrier to urge it into engagement with lower ridges 34 from below or, the carrier may be snapped into slots 40 similar to that shown for retention clip 80, FIG. 3.

The above described network of duct channels 24, interface alignment members 16, 64, 66, 68, 70 and terminal or component carriers 74, is now ready for initial cable installation. Wires and cables 76 are routed through channels 24 between the various duct termini and component carriers 74 as required. Flat cable retainers 77, as shown in FIGS. 1 and 2, may be snapped into parallel slots 40 at intervals along channels 24 to dress and retain wires and cables within the channel interior 78 prior to initial installation of channel covers 26 or, subsequently, when these covers are removed for cable rewiring or servicing. The combined flexibility of channel walls 30 and cable retainers 77 facilitates the rapid placement and removal of these retainers as may be necessary during subsequent system alteration.

An alternate three-point retainer 80 is shown in FIG. 3. This retainer includes a flat member 82, the ends of which are retained within opposed slots 40 in channel wall 30 in substantially the same manner as retainer 77. Flat member 82 includes a perpendicular leg 84 projecting downwardly from the center of the flat region and into T-groove 36 of the duct channel 24. As shown in FIG. 3, a pair of opposed feet 86 extend outwardly from the bottom of leg 84 in generally parallel relation to the flat upper member 82 and frictionally engage the L-shaped ridges 34 forming T-groove 36.

The installation of retainer 80 is accomplished by rotation 90 degrees from the position illustrated in FIG. 3. Leg 84 carrying opposed feet 86 slips easily into T-groove 36 between ridges 34. As retainer 80 is rotated 90 degrees to the position shown in FIG. 3, feet 86 are brought into frictional engagement with the portions of ridges 34 defining T-groove 36. Similarly, the distal ends of flat member 82 of the retainer are brought into frictional engagement with the ridges 38 defining opposed slots 40 at the upper end of duct 24 as the retainer 80 is rotated into the FIG. 3 position. The three-point retainer 80, after installation, divides the channel interior 78 into two generally equivalent half-channels and may be used to segregate or identify certain wires or cables.

Final duct assembly simply requires that the channel covers 26 be snapped onto the respective channels 24. As illustrated in FIG. 3, cover ridges or flanges 48 engage channel recesses 42 to provide secure retention of the cover. Finally, interface assembly covers 18 are similarly snapped into position thereby covering the alignment member, duct channel and channel cover ends, and wires and cables therein. Interface cover ridges 72 engage channel cover recesses 50 to effect interface cover retention.

It can be appreciated from the above description, that the duct system of this invention not only can be simply installed by the average homeowner without special tools, but that the wiring therein can be instantaneously re-accessed merely by unsnapping interface and channel covers. In this manner, the electrical cables can be quickly reached for service or rewired as electrical system requirements change. In addition, duct channel T-groove and sidewall ridges in the duct channel facilitate a wide range of cable retention clip and terminal or component carrier mounting options, thereby creating a complete overall duct system wherein additional, bulky and non-matching component or interface boxes are not required.

Further, the ease of installing or removing channels without the use of screws or nails which deface the mounting surface facilitates the removal of unused functionally obsolete portions of the duct system as well as system expansion to meet growing needs.

I claim:

1. A duct for wires, cables, conduits or like objects including: elongated U-shaped channel means and elongated U-shaped channel cover means; the channel means having a substantially flat bottom; adhesive means along the bottom permitting the channel means to be rapidly secured to a surface without resort to screws, nails or other similar anchors requiring defacing penetration of the surface; a pair of generally parallel channel sidewalls extending generally perpendicularly from the bottom defining a cable carrying region therebetween; each channel sidewall having a pair of spaced ridges disposed into the cable carrying region, the ridges defining respective channel sidewall cable retention clip slots; a pair of spaced ridges along the bottom disposed into the cable carrying region, the ridges along the bottom defining a bottom cable retention clip slot; indentations along the outward facing surfaces of each channel sidewall to receive and retain the channel cover means; the U-shaped elongated channel cover means having a top; a pair of generally parallel cover sidewalls extending generally perpendicularly from the top defining a channel receiving region therebetween, a ridge on each cover sidewall disposed into the channel receiving region adapted to engage the indentations on the channel sidewalls to secure and retain the cover means in covering engagement with the channel means; indentations along the outward facing surfaces of each cover sidewall adapted to receive and retain second cover means.

* * * * *